(12) United States Patent
Chen et al.

(10) Patent No.: US 9,695,076 B2
(45) Date of Patent: Jul. 4, 2017

(54) METHOD FOR REDUCING RELEASE OF RESISTANCE GENES DURING SLUDGE ANAEROBIC TREATMENT

(71) Applicant: Tongji University, Shanghai (CN)

(72) Inventors: Yinguang Chen, Shanghai (CN); Xiong Zheng, Shanghai (CN); Haining Huang, Shangahi (CN); Yinglong Su, Shanghai (CN); Mu Li, Shanghai (CN); Lijuan Wu, Shanghai (CN)

(73) Assignee: Tongji University, Shanghai (CN)

( * ) Notice: Subject to any disclaimer, the term of this patent is extended or adjusted under 35 U.S.C. 154(b) by 0 days.

(21) Appl. No.: 14/930,129

(22) Filed: Nov. 2, 2015

(65) Prior Publication Data

US 2016/0229727 A1    Aug. 11, 2016

(30) Foreign Application Priority Data

Feb. 3, 2015    (CN) .......................... 2015 1 0053338

(51) Int. Cl.
*C02F 11/04*    (2006.01)
*C02F 1/36*    (2006.01)
*C02F 101/30*    (2006.01)

(52) U.S. Cl.
CPC ............... *C02F 11/04* (2013.01); *C02F 1/36* (2013.01); *C02F 2101/30* (2013.01); *C02F 2209/06* (2013.01); *C02F 2209/36* (2013.01); *C02F 2303/06* (2013.01)

(58) Field of Classification Search
CPC .. C02F 11/04; C02F 2209/06; C02F 2209/36; C02F 2303/06
USPC .................................................. 210/603, 631
See application file for complete search history.

(56) References Cited

PUBLICATIONS

Machine-generated English Translation of CN 104086062A, generated on Dec. 8, 2016.*
Machine-generated English Translation of CN 101768609A, generated on Dec. 8, 2016.*

* cited by examiner

*Primary Examiner* — Fred Prince
(74) *Attorney, Agent, or Firm* — Wang Law Firm, Inc.

(57) ABSTRACT

A method for reducing release of resistance genes during sludge anaerobic treatment includes controlling concentration of to-be-treated sludge in a concentration tank to be 12-20 g/L by sedimentation under gravity. The concentrated sludge is transferred to a supersonic pre-treatment device to proceed with supersonic pre-treatment. The supersonic pre-treatment is conducted for 5-30 minutes at a power of 0.1-0.5 kW and a frequency of 10-40 kHz. The pre-treated sludge is then transferred to an anaerobic treatment device for anaerobic treatment. The anaerobic treatment is conducted for 4-12 days at a temperature of 20-37° C. The release amount of resistance genes in the residual sludge and the supernatant liquid in the anaerobic treatment device is detected. A feedback dosage of an alkali liquid is fed into the anaerobic treatment device according to the release amount of the resistance genes, controlling a pH value to be 9.0-11.0 during the anaerobic treatment.

7 Claims, 1 Drawing Sheet

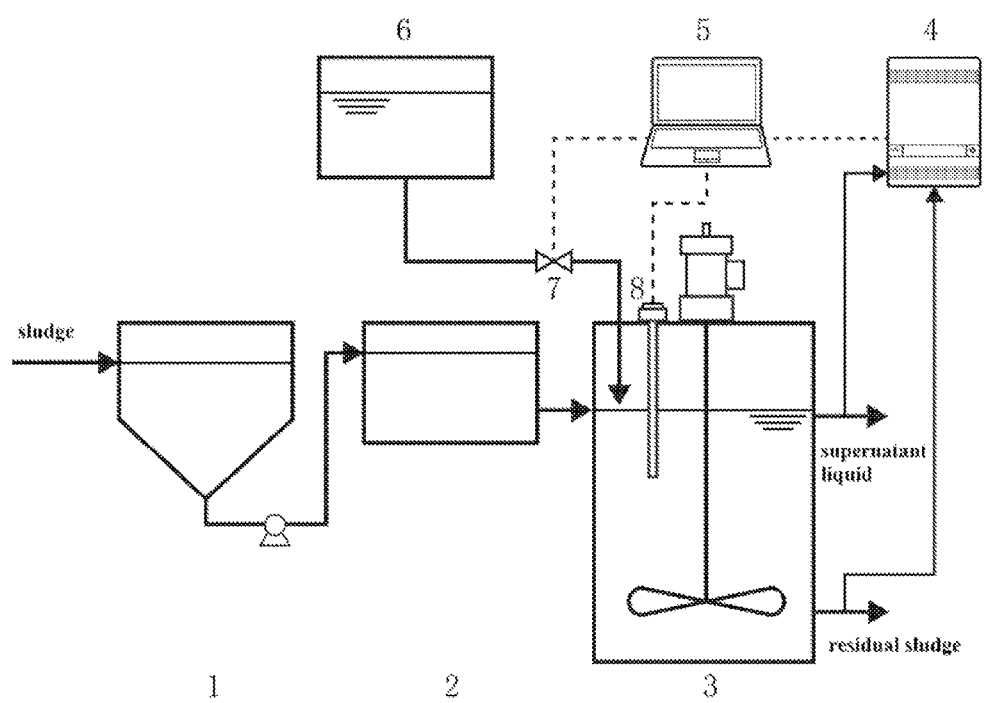

METHOD FOR REDUCING RELEASE OF RESISTANCE GENES DURING SLUDGE ANAEROBIC TREATMENT

BACKGROUND OF THE INVENTION

The present invention relates to the field of environmental protection technology and, more particularly, to a novel method for proceeding with sludge supersonic pre-treatment and controlling the pH value during sludge anaerobic treatment to significantly reduce the release amount of resistance genes that are common in residual sludge and supernatant liquid.

It is known that the use of antibiotics achieves an important effect in controlling infectious diseases. However, the abuse of antibiotics in recent decades causes mass propagation of resistant microorganisms and wide spread of resistance genes. Extensive research results have confirmed that sewage treatment plants receiving various waste waters have become the serious pollution sources of resistance microorganisms and resistance genes. The resistance genes as new pollutants not only damage the eco-environment but become a threat to the human health through the food chain. The wide use of tetracycline and sulfonamide antibiotics causes detection of a large amount of tetracycline and sulfonamide resistance genes in sewage treatment plants. Taking tetracycline resistance genes as an example, the concentration in effluent of a sewage treatment plant can be up to $10^2$-$10^6$ copies/mL, and the concentration in the excess sludge is as high as $10^8$-$10^9$ copies/g. It is known that anaerobic treatment is an important way to recycle sludge. However, conventional anaerobic treatment cannot effectively reduce the resistance genes in the sludge. Thus, to minimize the potential impact to the environment from the resistance genes, it is necessary to develop an effective, novel technique to reduce release of resistance genes during sludge anaerobic treatment.

Currently, some researchers have achieved the goal of reduction of resistance genes in sludge by controlling the sludge treatment conditions. For example, research in recent years found that the reduction effect of resistance genes by sludge anaerobic treatment was better than aerobic treatment. Furthermore, the temperature control during the anaerobic treatment could affect removal of resistance genes from sludge. Thermophilic fermentation was advantageous to removal of certain resistance genes. However, mesophilic fermentation had limited influence on removal of some resistance genes. According to the research by the inventor, the transfer of resistance genes relied on extracellular DNA and phages that are potential carriers increasing horizontal gene transfer. On the other hand, the number of gene carriers for horizontal transfer could be significantly reduced by supersonic treatment and adjusting the pH value during the anaerobic treatment, thereby affecting the release level of resistance genes.

BRIEF SUMMARY OF THE INVENTION

An objective of the present invention is to provide a method for reducing release of resistance genes during sludge anaerobic treatment.

The technical problem to be solved by the present invention is fulfilled by the following technical solution.

The present invention provides a method for reducing release of resistance genes during sludge anaerobic treatment. The method can be carried out by using a system including a concentration tank, a supersonic pre-treatment device, an anaerobic treatment device, a real-time fluorescent quantitative polymerase chain reaction (PCR) instrument, a computer, an alkali storage tank, an electric valve, and a pH detector, with the concentration tank including a bottom connected by a conduit and a valve to a sludge inlet in an upper portion of the supersonic pre-treatment device, with the supersonic pre-treatment device including a sludge outlet connected to the anaerobic treatment device, with the anaerobic treatment device including a lower portion having an outlet for residual sludge, with the anaerobic treatment device further including an upper portion having an outlet for a supernatant liquid, with the residual sludge and the supernatant liquid being detected while passing through the real-time fluorescent quantitative PCR instrument, with the alkali storage tank including a bottom connected by a conduit and the electric valve to an inlet in a top of the anaerobic treatment device, with the pH detector mounted on the upper portion of the anaerobic treatment device, with the computer connected to the real-time fluorescent quantitative PCR instrument, the electric valve, and the pH detector, with the method comprising:

(1) controlling concentration of to-be-treated sludge in the concentration tank to be 12-20 g/L by sedimentation under gravity;

(2) transferring the concentrated sludge into the supersonic pre-treatment device to proceed with supersonic pre-treatment, with the supersonic pre-treatment conducted for 5-30 minutes at a power of 0.1-0.5 kW and a frequency of 10-40 kHz;

(3) transferring the pre-treated sludge into the anaerobic treatment device for anaerobic treatment, with the anaerobic treatment conducted for 4-12 days at a temperature of 20-37° C.;

(4) detecting the release amount of resistance genes in residual sludge and the supernatant liquid in the anaerobic treatment device with the real-time fluorescent quantitative polymerase chain reaction (PCR) instrument; and (5) controlling a feedback dosage of an alkali liquid according to the release amount of the resistance genes and feeding the feedback dosage of the alkali liquid into the anaerobic treatment device to control a pH value to be 9.0-11.0 during the anaerobic treatment.

The to-be-treated sludge in step (1) can be primary sludge or the excess sludge or a mixture of the primary sludge and the excess sludge at an arbitrary ratio.

In an example, the resistance genes to be detected in step (4) include sulfonamide resistance genes sul I and sul II and tetracycline resistance genes tet O and tet Q.

In an example, the concentration of the to-be-treated sludge in the concentration tank is controlled to be 15 g/L in step (1), the supersonic pre-treatment in step (2) is conducted for 15 minutes at a power of 0.3 kW and a frequency of 30 kHz, the anaerobic treatment in step (3) is conducted for 8 days at a temperature of 35° C., and the pH value is controlled to be 10.0.

The present invention will be further described in connection with the accompanying drawings and specific embodiments.

DESCRIPTION OF THE DRAWINGS

The FIGURE is a schematic block diagram illustrating a system for carrying out a method for reducing release of resistance genes during sludge anaerobic treatment according to the present invention.

DETAILED DESCRIPTION OF THE INVENTION

A method for reducing release of resistance genes during sludge anaerobic treatment according to the present invention can be carried out by using a system (see FIG. 1) including a concentration tank 1, a supersonic pre-treatment device 2, an anaerobic treatment device 3, a real-time fluorescent quantitative polymerase chain reaction (PCR) instrument 4, a computer 5, an alkali storage tank 6, an electric valve 7, and a pH detector 8. The concentration tank 1 includes a bottom connected by a conduit and a valve to a sludge inlet in an upper portion of the supersonic pre-treatment device 2. The supersonic pre-treatment device 2 includes a sludge outlet connected to the anaerobic treatment device 3. The anaerobic treatment device 3 includes a lower portion having an outlet for residual sludge. The anaerobic treatment device 3 further includes an upper portion having an outlet for a supernatant liquid. The residual sludge and the supernatant liquid are detected while passing through the real-time fluorescent quantitative PCR instrument 4. The alkali storage tank 6 includes a bottom connected by a conduit and the electric valve 7 to an inlet in a top of the anaerobic treatment device 3. The pH detector 8 is mounted on the upper portion of the anaerobic treatment device 3. The computer 5 is connected to the real-time fluorescent quantitative PCR instrument 4, the electric valve 7, and the pH detector 8.

The method includes the following steps:

(1) controlling concentration of to-be-treated sludge in the concentration tank 1 to be 12-20 g/L by sedimentation under gravity;

(2) transferring the concentrated sludge into the supersonic pre-treatment device 2 to proceed with supersonic pre-treatment, with the supersonic pre-treatment conducted for 5-30 minutes at a power of 0.1-0.5 kW and a frequency of 10-40 kHz;

(3) transferring the pre-treated sludge into the anaerobic treatment device 3 for anaerobic treatment, with the anaerobic treatment conducted for 4-12 days at a temperature of 20-37° C.;

(4) detecting the release amount of resistance genes in residual sludge and the supernatant liquid in the anaerobic treatment device 3 with the real-time fluorescent quantitative polymerase chain reaction (PCR) instrument 4; and (5) controlling a feedback dosage of an alkali liquid according to the release amount of the resistance genes and feeding the feedback dosage of the alkali liquid into the anaerobic treatment device 3 to control a pH value to be 9.0-11.0 during the anaerobic treatment.

The to-be-treated sludge in step (1) can be the primary sludge or the excess sludge or a mixture of the primary sludge and the excess sludge at an arbitrary ratio.

The resistance genes to be detected in step (4) mainly include sulfonamide resistance genes sul I and sul II and tetracycline resistance genes tet O and tet Q.

The recommended parameters are: the sludge concentration is 15 g/L; the supersonic pre-treatment is conducted for 15 minutes at a power of 0.3 kW and a frequency of 30 kHz; the anaerobic treatment is conducted for 8 days at a temperature of 35° C.; and the pH value is controlled to be 10.0.

The advantageous effects of the present invention include:

1. The release amount of resistance genes in the residual sludge by the method according to the present invention are 1/100-1/30 of the release amount of resistance genes in the residual sludge by conventional sludge treatment systems (without supersonic treatment and without feedback for adjusting the pH value).

2. The release amount of resistance genes in supernatant liquid by the method according to the present invention are 1/10-1/5 of the reduction effect of the release amount of resistance genes in the supernatant liquid of the conventional sludge treatment systems (without supersonic treatment and without feedback for adjusting the pH value).

3. The present invention is easy to operate and provides an obvious reduction effect.

Example 1

(1) The concentration of sludge in the concentration tank 1 was controlled to be 12 g/L.

(2) The concentrated sludge was pumped into the supersonic pre-treatment device 2. The supersonic pre-treatment was conducted for 5 minutes at a power of 0.1 kW and a frequency of 10 kHz.

(3) The pre-treated sludge was moved into the anaerobic treatment device 3 for anaerobic treatment. The anaerobic treatment was conducted for 4 days at a temperature of 20±1° C.

(4) During the anaerobic treatment, the real-time fluorescent quantitative polymerase chain reaction (PCR) instrument 4 detected the release amount of resistance genes in the residual sludge and the supernatant liquid. The detected data was automatically inputted into the computer 5.

(5) The feedback dosage of the alkali liquid was controlled through the alkali storage tank 6, the electric valve 7, and the pH detector 8 to control the pH value to be 9.0±0.1. Compared to the conventional sludge treatment systems without supersonic treatment and without feedback for adjusting the pH value, the release amounts of tetracycline resistance genes tet O and tet Q in the residual sludge by the method according to the present invention were respectively reduced to be 1/30 and 1/35, the release amounts of sulfonamide resistance genes sul I and sul II in the residual sludge by the method according to the present invention were respectively reduced to be 1/40 and 1/36; the release amounts of tetracycline resistance genes tet O and tet Q in the supernatant liquid by the method according to the present invention were respectively reduced to be 1/5 and 1/5.3, and the release amounts of sulfonamide resistance genes sul I and sul II in the residual sludge by the method according to the present invention were respectively reduced to be 1/5.8 and 1/5.1.

Example 2

(1) The concentration of sludge in the concentration tank 1 was controlled to be 15 g/L.

(2) The concentrated sludge was pumped into the supersonic pre-treatment device 2. The supersonic pre-treatment was conducted for 15 minutes at a power of 0.3 kW and a frequency of 30 kHz.

(3) The pre-treated sludge was moved into the anaerobic treatment device 3 for anaerobic treatment. The anaerobic treatment was conducted for 8 days at a temperature of 35±1° C.

(4) During the anaerobic treatment, the real-time fluorescent quantitative polymerase chain reaction (PCR) instrument 4 detected the release amount of resistance genes in the residual sludge and the supernatant liquid. The detected data was automatically inputted into the computer 5.

(5) The feedback dosage of the alkali liquid was controlled through the alkali storage tank 6, the electric valve 7, and the pH detector 8 to control the pH value to be 10.0±0.1. Compared to the conventional sludge treatment systems without supersonic treatment and without feedback for adjusting the pH value, the release amounts of tetracycline resistance genes tet O and tet Q in the residual sludge by the method according to the present invention were respectively reduced to be 1/90 and 1/92, the release amounts of sulfonamide resistance genes sul I and sul II in the residual sludge by the method according to the present invention were respectively reduced to be 1/100 and 1/94, the release amounts of tetracycline resistance genes tet O and tet Q in the supernatant liquid by the method according to the present invention were respectively reduced to be 1/9.5 and 1/9.8, and the release amounts of sulfonamide resistance genes sul I and sul II in the residual sludge by the method according to the present invention were respectively reduced to be 1/10 and 1/9.2.

Example 3

(1) The concentration of sludge in the concentration tank 1 was controlled to be 20 g/L.

(2) The concentrated sludge was pumped into the supersonic pre-treatment device 2. The supersonic pre-treatment was conducted for 30 minutes at a power of 0.5 kW and a frequency of 40 kHz.

(3) The pre-treated sludge was moved into the anaerobic treatment device 3 for anaerobic treatment. The anaerobic treatment was conducted for 12 days at a temperature of 37±1° C.

(4) During the anaerobic treatment, the real-time fluorescent quantitative polymerase chain reaction (PCR) instrument 4 detected the release amount of resistance genes in the residual sludge and the supernatant liquid. The detected data was automatically inputted into the computer 5.

(5) The feedback dosage of the alkali liquid was controlled through the alkali storage tank 6, the electric valve 7, and the pH detector 8 to control the pH value to be 11.0±0.1. Compared to the conventional sludge treatment systems without supersonic treatment and without feedback for adjusting the pH value, the release amounts of tetracycline resistance genes tet O and tet Q in the residual sludge by the method according to the present invention were respectively reduced to be 1/75 and 1/78, the release amounts of sulfonamide resistance genes sul I and sul II in the residual sludge by the method according to the present invention were respectively reduced to be 1/82 and 1/80, the release amounts of tetracycline resistance genes tet O and tet Q in the supernatant liquid by the method according to the present invention were respectively reduced to be 1/6.8 and 1/7, and the release amounts of sulfonamide resistance genes sul I and sul II in the residual sludge by the method according to the present invention were respectively reduced by 1/7.6 and 1/7.2.

Although the invention has been described in connection with the embodiments shown in the accompanying drawings, a person having ordinary skill in the art can make various modifications to the invention based on the above descriptions. Therefore, some details of the embodiment should not be construed to restrict the invention. The scope of the invention is limited by the accompanying claims.

The invention claimed is:

1. A method for reducing release of resistance genes during sludge anaerobic treatment, with the method carried out by using a system including a concentration tank, a supersonic pre-treatment device, an anaerobic treatment device, a real-time fluorescent quantitative polymerase chain reaction (PCR) instrument, a computer, an alkali storage tank, an electric valve, and a pH detector, with the concentration tank including a bottom connected by a conduit and a valve to a sludge inlet in an upper portion of the supersonic pre-treatment device, with the supersonic pre-treatment device including a sludge outlet connected to the anaerobic treatment device, with the anaerobic treatment device including a lower portion having an outlet for residual sludge, with the anaerobic treatment device further including an upper portion having an outlet for a supernatant liquid, with the residual sludge and the supernatant liquid being detected while passing through the real-time fluorescent quantitative PCR instrument, with the alkali storage tank including a bottom connected by a conduit and the electric valve to an inlet in a top of the anaerobic treatment device, with the pH detector mounted on the upper portion of the anaerobic treatment device, with the computer connected to the real-time fluorescent quantitative PCR instrument, the electric valve, and the pH detector, with the method comprising:
 (1) controlling concentration of to-be-treated sludge in the concentration tank to be 12-20 g/L by sedimentation under gravity;
 (2) transferring the concentrated sludge into the supersonic pre-treatment device to proceed with supersonic pre-treatment, with the supersonic pre-treatment conducted for 5-30 minutes at a power of 0.1-0.5 kW and a frequency of 10-40 kHz;
 (3) transferring the pre-treated sludge into the anaerobic treatment device for anaerobic treatment, with the anaerobic treatment conducted for 4-12 days at a temperature of 20-37° C.;
 (4) detecting a release amount of resistance genes in residual sludge and the supernatant liquid in the anaerobic treatment device with the real-time fluorescent quantitative polymerase chain reaction instrument; and
 (5) controlling a feedback dosage of an alkali liquid according to the release amount of the resistance genes and feeding the feedback dosage of the alkali liquid into the anaerobic treatment device to control a pH value to be 9.0-11.0 during the anaerobic treatment.

2. The method for reducing release of resistance genes during sludge anaerobic treatment as claimed in claim 1, wherein the to-be-treated sludge in step (1) is primary sludge or the excess sludge or a mixture of the primary sludge and the excess sludge at an arbitrary ratio.

3. The method for reducing release of resistance genes during sludge anaerobic treatment as claimed in claim 1, wherein the resistance genes to be detected in step (4) include sulfonamide resistance genes sul I and sul II and tetracycline resistance genes tet O and tet Q.

4. The method for reducing release of resistance genes during sludge anaerobic treatment as claimed in claim 1, wherein:
 the concentration of the to-be-treated sludge in the concentration tank is controlled to be 15 g/L in step (1);
 the supersonic pre-treatment in step (2) is conducted for 15 minutes at a power of 0.3 kW and a frequency of 30 kHz;
 the anaerobic treatment in step (3) is conducted for 8 days at a temperature of 35° C.; and
 the pH value is controlled to be 10.0.

5. A method for reducing release of resistance genes during sludge anaerobic treatment, comprising:

(1) controlling concentration of to-be-treated sludge in a concentration tank to be 12-20 g/L by sedimentation under gravity;

(2) transferring the concentrated sludge into a supersonic pre-treatment device to proceed with supersonic pre-treatment, with the supersonic pre-treatment conducted for 5-30 minutes at a power of 0.1-0.5 kW and a frequency of 10-40 kHz;

(3) transferring the pre-treated sludge into an anaerobic treatment device for anaerobic treatment, with the anaerobic treatment conducted for 4-12 days at a temperature of 20-37° C.;

(4) detecting a release amount of resistance genes in residual sludge and the supernatant liquid in the anaerobic treatment device; and (5) feeding a feedback dosage of an alkali liquid into the anaerobic treatment device according to the release amount of the resistance genes, controlling a pH value to be 9.0-11.0 during the anaerobic treatment, wherein the release amount of resistance genes in residual sludge and the supernatant liquid in the anaerobic treatment device is detected by using a real-time fluorescent quantitative polymerase chain reaction (PCR) instrument, and wherein the resistance genes to be detected include sulfonamide resistance genes sul I and sul II and tetracycline resistance genes tet O and tet Q.

6. The method for reducing release of resistance genes during sludge anaerobic treatment as claimed in claim 5, wherein the to-be-treated sludge in the concentration tank is primary sludge or the excess sludge or a mixture of the primary sludge and the excess sludge at an arbitrary ratio.

7. The method for reducing release of resistance genes during sludge anaerobic treatment as claimed in claim 5, wherein:

the concentration of the to-be-treated sludge in the concentration tank is controlled to be 15 g/L;

the supersonic pre-treatment is conducted for 15 minutes at a power of 0.3 kW and a frequency of 30 kHz;

the anaerobic treatment is conducted for 8 days at a temperature of 35° C.; and the pH value is controlled to be 10.0.

* * * * *